United States Patent [19]
Wilkins

[11] Patent Number: 6,113,157
[45] Date of Patent: Sep. 5, 2000

[54] ADJUSTABLE BALL JOINT CONNECTOR

[75] Inventor: Robert Lee Wilkins, Houston, Tex.

[73] Assignee: Kvaerner Oilfield Products, Houston, Tex.

[21] Appl. No.: 09/057,738

[22] Filed: Apr. 9, 1998

[51] Int. Cl.[7] .............................................. F16L 27/053
[52] U.S. Cl. ........................ 285/263; 285/920; 411/14.5
[58] Field of Search .................................. 285/920, 900, 285/412, 261, 263, 264, 266, 271, 184; 411/14.5, 915, 916

[56] References Cited

U.S. PATENT DOCUMENTS

| | | | |
|---|---|---|---|
| 1,733,457 | 10/1929 | Hannahs | 285/271 X |
| 3,130,628 | 4/1964 | Blinn | 411/916 X |
| 3,739,846 | 6/1973 | Beson | 166/89 |
| 3,944,263 | 3/1976 | Arnold | 285/261 X |
| 3,965,977 | 6/1976 | Beson | 166/88 |
| 4,133,558 | 1/1979 | Ahlstone | 285/261 X |
| 4,618,173 | 10/1986 | Dopuera et al. | 285/263 X |
| 4,696,494 | 9/1987 | Schmitz et al. | 285/263 X |
| 4,703,774 | 11/1987 | Seehausen | 137/614 |
| 4,709,725 | 12/1987 | Morrison | 137/614 |
| 4,796,922 | 1/1989 | Prichard | 285/26 |
| 4,852,611 | 8/1989 | Knerr et al. | 137/595 |
| 6,003,604 | 12/1999 | Wilkins | 285/261 X |

FOREIGN PATENT DOCUMENTS

| | | |
|---|---|---|
| 2097885 | 11/1982 | United Kingdom . |
| 2132728 | 7/1984 | United Kingdom . |
| 2184508 | 6/1987 | United Kingdom . |
| 2195158 | 3/1988 | United Kingdom . |

*Primary Examiner*—Terry Lee Melius
*Assistant Examiner*—Greg Binda
*Attorney, Agent, or Firm*—Wendy K. Buskop; Buskop Law Group

[57] ABSTRACT

An apparatus for joining two flowlines, one having an external flanged end and the other an enlarged flaring portion at one end. A ball with an axial flow passage is seated in receptacle cavities formed in said ends and in fluid-tight sealing engagement therewith. A collar is sleeved and clamped about the flared end of the second flowline by bolts which connect the first flowline flange with the collar. Piston drive means are provided for driving against the collar to stretch the bolts by an amount sufficient to release the second flowline member and allow limited articulated movement of the second flowline without compromising the seal effectiveness of the joint.

14 Claims, 4 Drawing Sheets

ADJUSTABLE BALL JOINT CONNECTOR

FIELD OF THE INVENTION

This invention relates to a ball joint connector and, more particularly, to an adjustable ball joint connector which can be manipulated by remote controls to allow pivotal and swivelling movement of members which are joined by the connector.

BACKGROUND OF THE INVENTION

The installation, connection and repair of pipelines at extensive water depths is commonly achieved by remote operations which typically involve the utilization of a Remote Operated Vehicle (ROV) equipped with television cameras, automatically controlled gripping arms, and hydraulic power connections. A variety of pivotal ball flange connectors designed for installation by remote control means are now in wide use for connecting flowline members at extensive water depths since this type of connector advantageously allows for connecting the ends of two flowline members without first requiring their exact alignment. Articulated ball connectors for use with pipelines are disclosed in U.S. Pat. Nos. 4,180,285 and 4,632,432. These connectors include remotely actuatable guide means for initial positioning of the pipes ends and hydraulically actuated locking means for fixing the pipes in a fluid-tight seal connection. However, should a subsequent adjustment of the connection, become necessary, as for example, to alter, the alignment of the connected members, this cannot be readily achieved without a considerable expenditure of time and effort, and without compromising the seal effectiveness of the connection. Accordingly, there is need for a connector which allows for flexure of the joint by remote controls in a timely efficient and reliable manner without losing the fluid-tight seal of the connection.

SUMMARY OF THE INVENTION

The invention is a ball joint connector for connecting first and second structural arm members such as flowlines. The first member is provided with a longitudinal axis, and an external radial flange at one end. The second arm member is provided with a longitudinal axis, an outwardly flaring end portion and receptacle cavity configured as a segment of a hemisphere in the transverse end surface at the flaring end thereof. An external surface for the flaring end portion is formed as the segment of a sphere which is coaxial and concentric with the receptacle surface but with a larger radius of curvature. A collar is sleeved about the flaring end portion of the second arm member and is provided with an internal coaxial annular surface having a first annular portion matching the external surface of the flaring end portion and a second annular portion with an internal diameter greater than the external diameter of the flowline member enclosed therein.

The apparatus includes a ball member in the form of a segment of a sphere disposed between said first and second flowline members with its external surface in concentric conforming engagement with said receptacle cavity surface and further includes means for joining the two arm members which includes a plurality of bolts, each of which has a bolt shaft which extends through the radial flange of the first arm member into threaded engagement with the collar so as to clamp the collar against the second arm member. The bolts are arranged in angular spacing around the first arm member and the central axis of the collar. The apparatus further includes a hydraulically actuated drive means for applying a force to the collar so as to stretch the length of each of the bolts by a limited distance to thereby loosen the engagement of the collar with the second arm member without losing the fluid-tight seal therebetween and thereby loosen the junction to allow articulated movement of the second arm member with respect to the first arm member. The force applied to the collar is predetermined so as not to exceed the elastic limit of the bolts and when withdrawn allows the bolts to return to their normal length and reestablish the clamping function of the collar and thereby fix the orientation of the second arm member with respect to the first arm member. In the preferred embodiment of the invention, the arm members are flowline members connected by the ball joint connector in fluid communication and in fluid-tight sealed relationship.

DETAILED DESCRIPTION OF THE INVENTION

Figure 1:
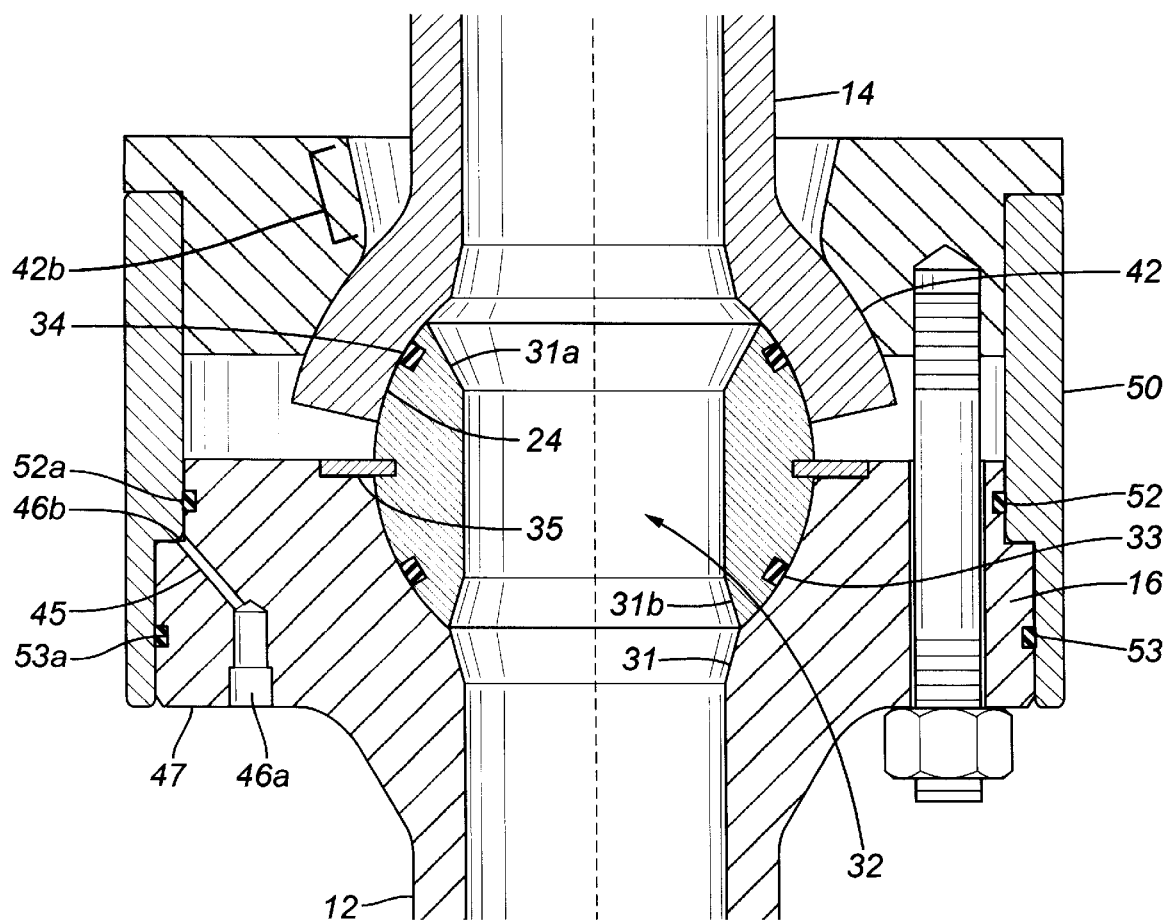
FIG. 1 is a vertical cross section view of an articulated ball connector of the present invention for use in connecting two flowline members, and wherein the flowline members are joined and fixed in coaxial alignment.
Figure 2:
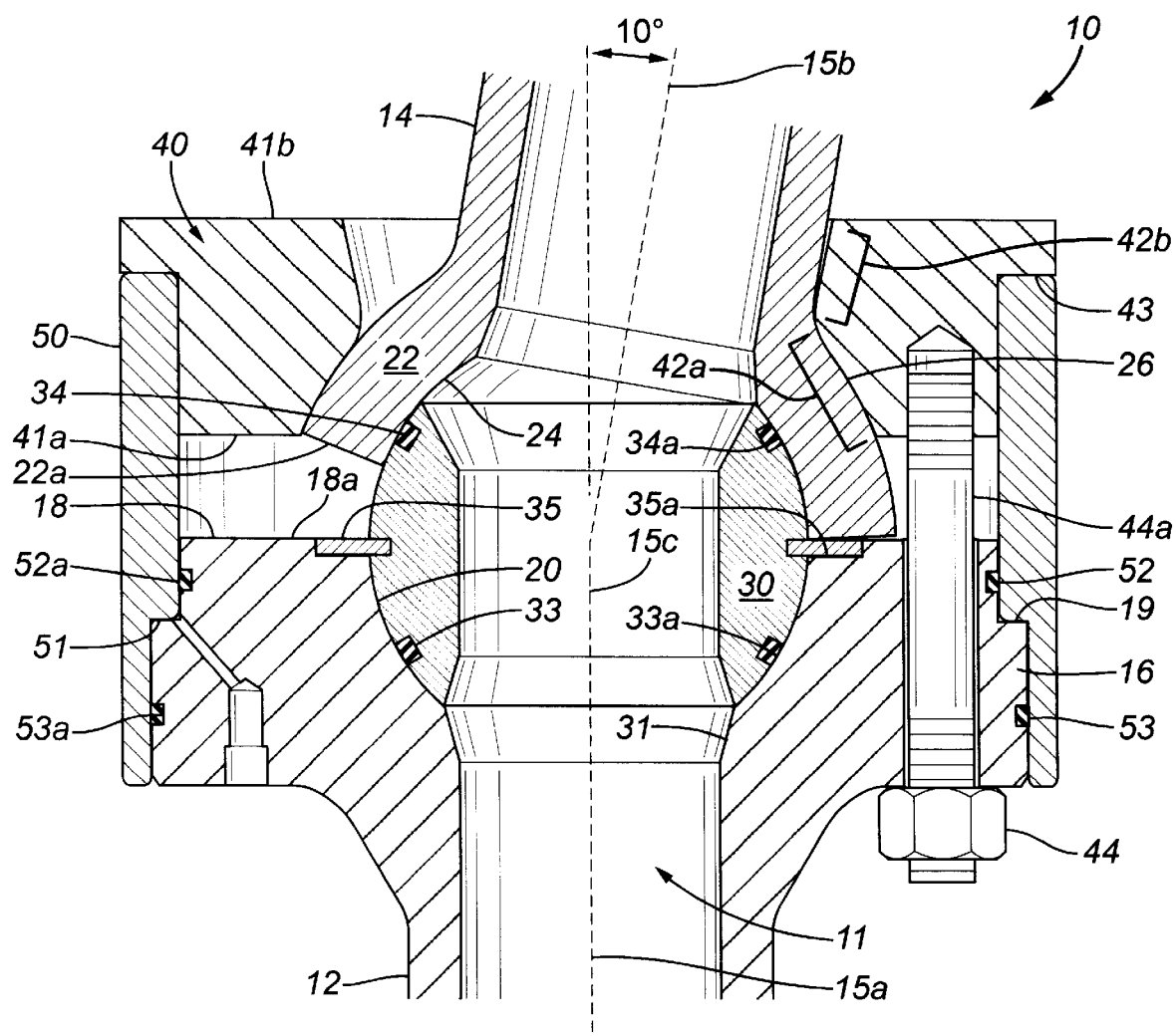
FIG. 2 is a sectional view similar to FIG. 1 but showing the two flowline members in a new orientation after pivotal movement permitted after loosening of the junction in accordance with the invention.
Figure 3:
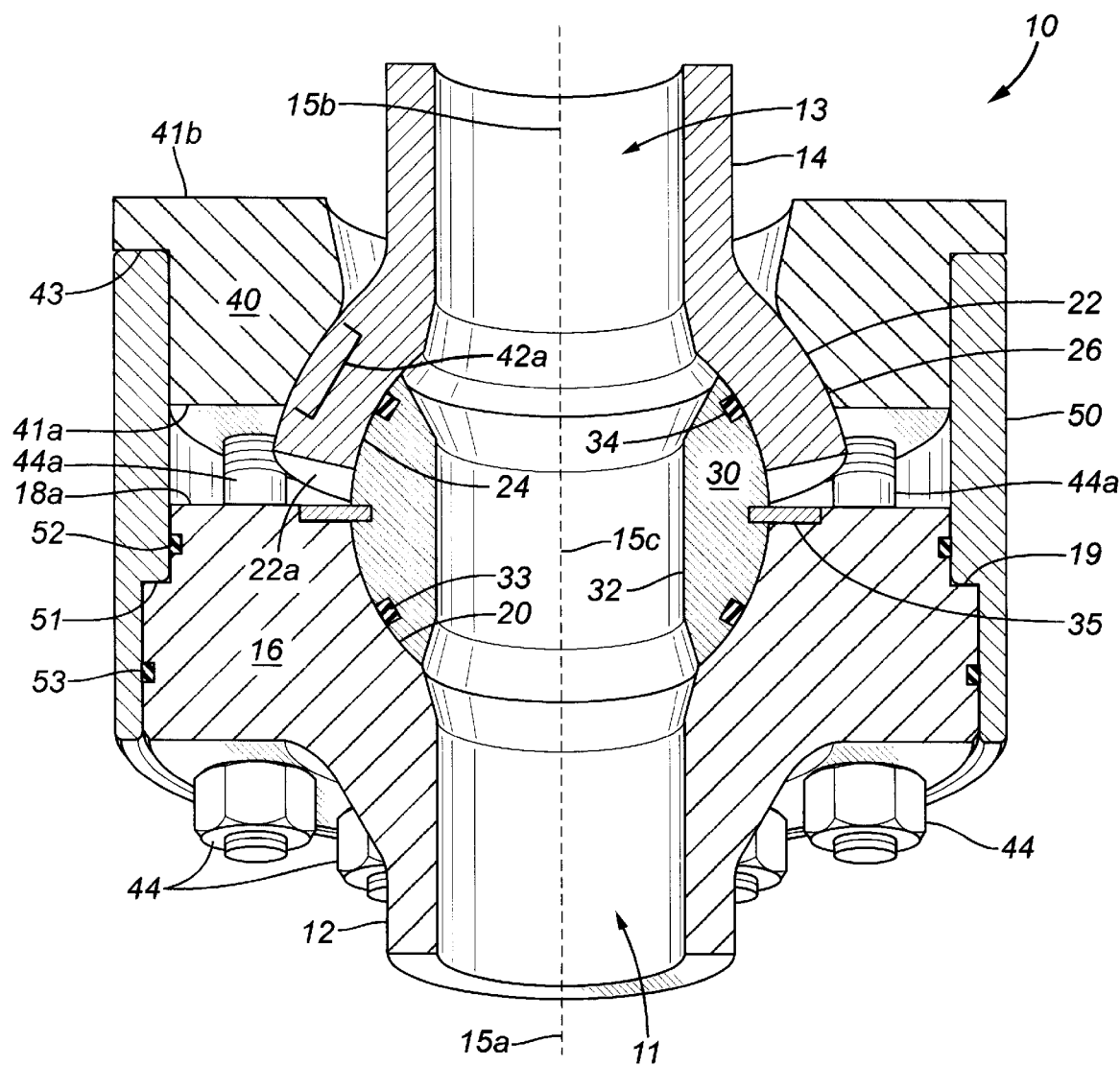
FIG. 3 is a perspective view of a vertical cross section of the connector of the invention in the orientation of the flowline members as shown in FIG. 1.

Referring more particularly to the drawings, there is shown in FIGS. 1–3, an articulated connector 10 for joining a first flowline member to a second flowline member 14.

The flowline members 12 and 14 are short pieces of pipe which are adapted to be butt welded or otherwise connected in a pipeline such as an oil or gas well pipeline installed at great ocean depths. The flowline member 12 has a central longitudinal axis 15a, an axial flow passage 11 and is provided with an external annular radial flange 16 which extends to the end 18 of the pipe and provides an annular end face 18a in a transverse plane radial to the axis 15a. For purposes to be hereinafter described, the flange 16 is formed with an external annular coaxial shoulder 19 which faces towards the end 18.

The flange 16 is also formed with a receptacle cavity in the form of an internal annular coaxial surface 20 configured as a segment of a hemisphere which opens with its largest cross-section diameter in the end face 18a.

The second flowline member 14 has a central longitudinal axis 15b and an axial flow passage 13 and is provided with an outwardly flaring end portion 22 which terminates in an annular end face 22a of frusto-conical configuration. The interior of the flowline 14 is provided with a coaxial annular interior surface 24 in the form of a segment of a hemisphere of smaller axial dimension than the surface 20 with a radius of curvature equal to that of the receptacle cavity 20 and with its largest cross section diameter coincident with the inner diameter of the end face 22a and smaller than the largest diameter of the surface 20. The surface 24 provides the apparatus with a second receptacle cavity. The exterior of the flaring end portion 22 is also a coaxial annular surface 26 in the form of a segment of a hemisphere having a greater radius of curvature than the interior receptacle cavity 24.

The connector 10 includes a ball 30 in the form of a segment of a sphere symmetrically formed about a diameter of the sphere. The ball 30 has a central axis 15c and an axial flow passage 32. The ball 30 is seated in the two receptacle cavities 20,24 in concentric relation therewith and with its flow passage in coaxial alignment with the longitudinal axes 15a, 15b of the two flowline members 12 and 14.

It is to be noted that each of the ends of the axial flow passage 32 is enlarged by an outwardly diverging frusto-conical surface 31a, 31b respectively. The external spherical surface of the ball 30 has a radius of curvature which matches the radius of curvature of the two receptacle cavities 20, 24 so that its external surface engages and conforms with the internal annular surfaces of the two receptacle cavities and is in concentric relation therewith.

The ball member 30 is also provided with a pair of sealing rings 33, 34 which seat in annular grooves 33a, 34a formed in its external surface in coaxial relation to the axis 15c and in symmetrical orientation with respect to the transverse diameter of the ball 30. A third annular groove 35a is formed in the surface of the ball 30 in parallel relation to the grooves 33a, 34a and approximately midway therebetween. The groove 35a accommodates a split-ring metallic retainer 35 which projects from the surface of the ball and seats in the coaxial annular groove 35a which is formed in the end face 18a of the flowline member 12 and extends inwardly to open into the interior surface 20 of the member 11. The retainer ring 35 precludes any rotary movement of the ball 30 other than about its axis 15c and serves to maintain the coaxial alignment of the ball 30 and its axial flow passage 32 with the flowline member 12. The sealing rings 33,34 may be O-rings, elastomeric rings or metal, or a combination thereof. For gas wells, metallic seals are preferred.

The apparatus 10 further includes a collar 40 which seats on the flaring end portion 22 of the flowline member 14 and is positioned coaxial therewith. The collar 40 is provided with an interior annular surface 42 which includes a first annular portion 42a which extends to one end 41a of the collar and a second annular portion 42b which extends to the other end 41b of the collar. The annular curved surface portion 42a matches the curvature of the exterior surface 26 of the outwardly flaring end portion 22 of the flowline member 14 so that when the collar is seated, its annular surface portion 42a engages the exterior surface 26 throughout and is concentric therewith. The upper annular portion 42b of the interior surface 42 as seen FIG. 1 is substantially a frusto-conical surface which diverges outwardly to the end 41b. The taper of the surface portion 42b corresponds to the cone angle of its frusto-conical surface. In the preferred embodiment of the invention, the particular taper selected is predetermined so that the surface 42b can serve as a stop to control the degree of potential pivotal movement of the flowline member 14 with respect to the flowline member 12.

The collar 40 is fixed to the flowline member 12 by a plurality of bolts 44, each provided with a bolt shaft 44a which extends through a bore formed in the flange 16 and with its threaded end received in a threaded blind bore in the collar 40. The bolts 44 are disposed with their shafts in parallel relation to the axes of the collar 40, the ball 30 and the flowline member 16. Preferably, they are also arranged in a circle in equiangular spaced relation to one another about the collar axis. When the bolts are tightened to an appropriate tension level, such as A.P.I. recommended bolt tension and stress levels, the collar 40 clamps against the flowline member 12 which in turn clamps against the ball 30 and thereby maintains the flowline members 12 and 14 in a fixed relation. At the appropriate level, the tension of the bolts exceeds the forces which normally act on the connector and is also sufficient to produce clamping and effective sealing by the connector seals.

It is also to be seen that when the flowline members are fixed in coaxial relation the end face 22A of the flowline member 14 is spaced from the end face 18a of the flowline member 12 because of the shorter axial length of the flaring end portion 22 of the flowline member 14 relative to the larger radial dimension of the ball 30.

However, the apparatus further includes a hydraulic drive means which comprises an annular piston 50 which is sleeved about the flange 16 of the flowline member 12 and extends beyond the end 18 of the member 12 to engage the collar 40. The piston 50 is provided with an internal annular radial shoulder 51 which seats against the annular shoulder 19 on the flange 16 and the end of the piston 50 engages an external radial shoulder 43 which is provided on the collar 40 and faces toward the flowline member 12.

The flange 16 is also provided with a second flow passage 45 which is offset from the flowline passage 11 and extends from an inlet port 46a formed in the radial shoulder 47 provided by the flange 16 and opens at an outlet 46b in the radial shoulder 19 which seats the piston 50. A fluid-tight sealing relationship is established between the piston and the flowline flange 16 by annular seals 52,53 which seat in accommodating coaxial grooves 52a, 53a formed in the exterior of the flange to extend circumferentially about the flange. The grooves 52a,53a lie on opposite sides of the shoulder 19 and therefore are in straddle relation to the hydraulic outlet 46b.

When it becomes desirable to alter the relationship of the flowline member 14 with respect to the flowline member 12, as for example to relieve strain in the pipeline or to establish a flowline between misaligned inlet and outlet members, hydraulic pressure can be delivered to the piston 50 by connection of a source of hydraulic pressure with an appropriate fitting (not shown) mounted in the inlet 46a. The hydraulic pressure supplied to the piston shoulder 51 is calculated so as to drive the piston against the collar 40 and apply a force thereto which acts in the axial direction of the collar 40 and thereby imposes an axially directed force on each of the bolts 44. The force is predetermined so as to stretch the bolts 44 by a limited amount which is sufficient to loosen the clamping relationship of the collar 40 and the flowline member 12 without exceeding the yield strength and elastic limit of the bolts. Preferably, the force should be limited to apply a stress of 50% to 66% of the yield strength of the bolts. When the bolts 44 are stretched the predetermined amount, as for example in the range of 1 mm to 1.5 mm, the flowline member 14 can then be pivoted about the center point of the ball 30 and swivelled as necessary up to 360° of rotation in either direction to establish a desired orientation with respect to the flowline member 12. By virtue of the 10° of taper of the interior surface 41b of the collar 40, and also contact of the end face 22a of flowline member 14 with the end 18 of flowline member 12, pivotal movement of the flowline member 14 cannot exceed 10° in any given direction. It is to be understood, of course, that the taper of the surface 41b and the axial length of the flaring end portion 22 of flowline member 14 can be selected to allow for greater or smaller pivotal movement as may be desired.

Figure 4:
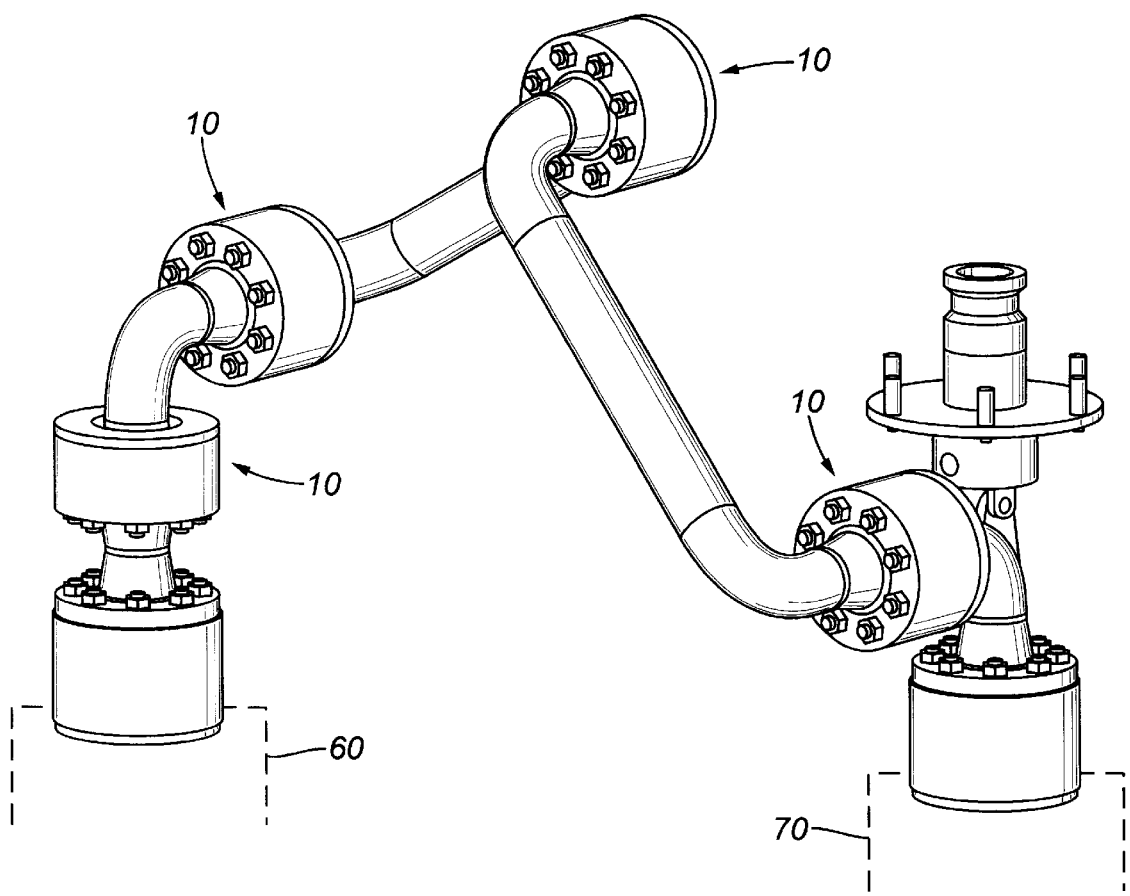
FIG. 4 is a perspective view of a subsea wellhead connection assembly showing an application of the connector of the invention in a flowline which connects a subsea wellhead with a manifold.

It is therefore to be seen that a connector is disclosed herein for joining two joints of pipe in a fixed fluid-tight relationship and includes means responsive to remote controls for flexing the joint to alter the alignment relationship of the pipes to a desired orientation. In some applications wherein elastomer seals are used, it can be done without compromising the fluid-tight sealing capability of the joint during the flexure. Where metal seals are used, the connector should be sufficiently loosened that the seals will not be scratched during articulation. The connector is particularly suited for use in flowlines in a subsea environment. Furthermore, because of the bevel surfaces 31 at the ends of flow passage 32 through the ball 30, there are no flat shoulders in the flow passage through the connector 10 as would interfere with the passage of "pigs" or similar devices through the connector. A typical application of the connector is shown in FIG. 4 in a subsea wellhead connection wherein four of the connectors 10 of the invention are installed in a flowline which conveys oil or gas from the wellhead 60 to a manifold 70. The use of more than one connector in a serial relation as shown enhances the flexibility of the flowline and its adaptability for installation between misaligned inlet and outlet members.

It is to be appreciated therefore that the foregoing description of a preferred embodiment of the invention has been presented for purposes of illustration and explanation and is not intended to limit the invention to the precise form disclosed. For example, the collar could be modified to alter or eliminate the frusto-conical portion of its internal annular surface and instead rely on engagement of the end surface 22a of the flowline member 14, when pivoted with the end 18 of the member 12 to limit the range of pivotal movement. It is also possible to manufacture the ball joint connector such that the ball member 30 is an integral part of the end of the flowline member 12. It is to be appreciated therefore, that various changes may be made by those skilled in the art without departing from the spirit of the invention.

What is claimed is:

1. An articulated connector for connecting together portions of a pipeline, the articulated connector comprising:

a first flowline member having a central longitudinal axis, an axial flow passage, and an external radial flange at one end thereof, said radial flange having a first internal coaxial annular surface in the form of a segment of a hemisphere to provide a first receptacle cavity in the end of the first flowline member;

a second flowline member having a central longitudinal axis, an axial flow passage, and an outwardly flaring end portion having a second internal coaxial annular surface to provide a second receptacle cavity configured as a segment of a hemisphere with the same radius of curvature as said first internal coaxial annular surface, said flaring end portion having an external surface formed as the segment of a sphere with a larger radius than the second internal coaxial annular surface and in coaxial relation therewith;

a collar disposed in sleeved relation on the flaring end portion of said second flowline member and provided with an interior annular surface having a first annular portion matching the curvature of the external surface of said flaring end portion and in conforming engagement therewith and a second annular portion with an internal diameter which is greater than the external diameter of said second flowline member;

a ball member in the form of a segment of a sphere symmetrical about a diameter of the sphere with a radius of curvature conforming to that of said first and second internal coaxial annular surfaces and disposed between said first and second flowline members with its external surface in conforming engagement with said first and second internal coaxial annular surfaces, said ball member having a flow passage extending therethrough in coaxial relation with said first flowline member and said collar;

means for joining said first flowline member to said second flowline member in a fixed relation to one another, said means comprising a plurality of bolts, each of which has a bolt shaft which extends through said radial flange into threaded engagement with said collar and clamps the collar against the second flowline member to hold the second flowline member in fixed relation to the first flowline member and the collar in spaced relation to the first flowline member, said bolts being arranged in an angular spacing around the longitudinal axes of the first flowline member and said collar; and a drive means for applying a force to stretch the length of each of said bolts by a limited amount to thereby loosen the engagement of the collar with the second flowline member and the junction of said first and second flowline members and to allow articulated movement of the second flowline member with respect to the first flowline member, said force being predetermined so as not to exceed the yield strength of said bolts and upon being withdrawn to allow the bolts to shrink in length and reestablish a clamping engagement of the collar with the second flowline member.

2. An articulated connector for connecting first and second flowline members as set forth in claim 1 wherein said apparatus further includes a first annular seal means for establishing a fluid tight seal between said ball member and the first flowline member, and a second annular seal means for establishing a fluid tight seal between said ball member and the second flowline member.

3. An articulated connector for connecting first and second flowline members as set forth in claim 2 wherein said drive means includes a piston mounted on said first flowline member and responsive to an application of fluid pressure to drive said collar with a predetermined force in an axial direction away from said first flowline member to allow articulated movement of the second flowline member with respect to the first flowline member while retaining the seal of the ball member with the first and second flowline member and the sealing integrity of the connection.

4. An articulated connector as set forth in claim 3 wherein said piston is in the form of a hollow cylinder in sleeved relationship to said external radial flange on the end of the first flowline member and which is provided with a transverse piston shoulder which is disposed in a first position of said piston to seat on a transverse shoulder provided on said external radial flange, said piston being moveable from said first position in response to an application of fluid pressure to where the end of said piston applies a driving force to urge said collar in an axial direction away from said first flowline member.

5. An articulated connector as set forth in claim 4 wherein said radial flange is provided with a second flow passage having an inlet port adapted to be connected to a source of fluid pressure and an outlet port exposed to said piston transverse shoulder whereby the piston is adapted to be exposed to a source of hydraulic fluid pressure to apply force to drive said piston against said collar to thereby stretch and increase the length of each of said bolts by a limited distance and thereby loosen the junction between said flowline members and allow articulated pivotal movement of the second flow line member with respect to said first flow line member, said force being predetermined so as not to exceed the tensile strength of said bolts whereby upon withdrawal of the applied piston force the bolts will return to their original length.

6. An articulated connector for providing an articulated joint for portions of a pipeline, the articulated connector comprising: a first arm member having a longitudinal axis and being provided at one end with ball means having an external surface configured as the segment of a sphere, said first arm member being also provided with an external radial flange in encircling relation to said ball means and coplanar with the center of curvature of said segment;

a second arm member having a longitudinal axis and an outwardly flaring end portion which diverges outwardly to one end of said second arm member and provides a transverse radial end surface for said second arm member, said second arm member being provided with a receptacle cavity in its transverse radial end surface in the configuration of a segment of a hemisphere with a largest cross section diameter which is less than the cross section diameter of its associated sphere, said flaring end portion having an external surface formed as the segment of a sphere in coaxial concentric relation with said receptacle cavity;

a collar having a central axis and disposed in sleeved relation on the flaring end portion of said second arm member and provided with an internal coaxial annular surface having a first annular surface portion matching the external surface of said flaring end portion and in conforming engagement therewith and a second annular surface portion with an internal diameter which is greater than the transverse cross section dimension of said second arm member adjacent to said flaring end portion;

means for joining said first arm member to said second arm member with the receptacle cavity in said second arm member disposed in concentric relation with said ball means and with the longitudinal axes of said arm members in a first orientation with respect to one another, said means comprising a plurality of bolts, each of which has a bolt shaft which extends through said flange into threaded engagement with said collar and clamps the collar against the second arm member, said bolts being arranged in an angular spacing around said first arm member and the longitudinal axis of said collar; and a drive means for applying a force to temporarily increase the length of each of said bolts by a limited distance to thereby loosen the engagement of the collar with the second arm member and thereby loosen the junction of said first and second arm members to allow articulated movement of the second arm member to a new orientation with respect to the first arm member, said force being predetermined so as not to exceed the elastic limit of said bolts and upon being withdrawn allows the bolts to reestablish a clamping engagement of the collar.

7. An articulated connector as set forth in claim 6 wherein said first and second arm members are flowline members, each having a longitudinal axis and an axial flow passage extending therethrough, and with said passages connected in fluid communication.

8. An articulated connector for connecting together portions of a pipeline, the articulated connector comprising: a first flowline member having a central flow passage extending therethrough, an external radial flange at one end and a first receptacle cavity in the end surface at said one end, said first cavity having an annular surface configured as a segment of a hemisphere, a second flowline member having a central flow passage extending therethrough, an enlarged flaring end portion and a second receptacle cavity formed in said flaring end portion, said second cavity having an annular surface in axial alignment with the passage through said second flowline member and configured as a segment of a hemisphere smaller than said first receptacle cavity and having a radius of curvature equal to that of said first receptacle and having a radius of curvature equal to that of said first receptacle cavity, said flaring end portion having an external annular surface in the form of a segment of a sphere of greater than the surface of the second receptacle cavity and in coaxial alignment therewith;

a collar disposed in relation to the flaring end portion of the second flowline member, said collar provided with a central axis and an internal annular surface encircling its central axis and having an annular portion which matches the external annular surface of said flaring end portion and which is in sleeved engagement therewith;

a ball member in the configuration of a segment of a sphere and having an axial passage therethrough, said ball member being seated in said first and second receptacle cavities between said flowline members in coaxial alignment with said collar and its axial passage aligned with said first flowline member passage;

bolt means for joining said first flowline flange to said collar in coaxial relation with said collar, said bolt means comprising a plurality of bolts in angular spaced relation about the longitudinal axis of said collar, each of which bolts has a bolt shaft which extends through said first flange into threaded engagement with said collar in parallel relation to the longitudinal axes of said collar and said first flowline member and holds the collar in spaced relation to the first flowline member and fixes the second flowline member in a first fixed orientation with respect to the first flowline member;

a drive means for applying a force to stretch the length of each of said bolts by a limited amount to thereby loosen the engagement of the collar with the second arm member and thereby loosen the junction of said first and second arm members to allow articulated movement of the second arm member with respect to the first arm member, said force being predetermined so as not to exceed the yield strength of said bolts and upon being withdrawn allows the bolts to shrink in length and reestablish clamping engagement with said collar; and means for limiting the degree of pivotal movement of the second flowline member with respect to the first flowline member while allowing axial rotation of the second flowline member throughout a range of 360° in either direction of rotation when said collar is loosened by said drive means.

9. An articulated connector for connecting first and second flowline members as set forth in claim 8 wherein said apparatus further includes a first annular seal means for establishing a fluid tight seal between said ball member and the first flowline member, and a second annuler seal means for establishing a fluid tight seal between said ball member and the second flowline member.

10. An articulated connector for connecting first and second flowline members as set forth in claim 9 wherein the internal annular surface of said collar includes a second annular portion in spaced relation to said second flowline member and in a frusto-conical configuration drawing a selected taper angle which establishes the limiting angle of pivotal movement of the second flowline member with respect to the first flowline member.

11. An articulated connector for connecting first and second flowline members as set forth in claim 8 further including means for maintaining said ball member with its axial flow passage in alignment with the flow passages through said first and second flowline members.

12. An articulated connector for connecting first and second flowline members as set forth in claim 8 wherein said drive means applies a force to said bolts which stresses said bolts within the range of 50% to 66% of their yield strength.

13. An articulated connector for connecting together portions of a pipeline, the articulated connector comprising:

a first flowline member having a central longitudinal axis, an axial flow passage, and an external radial flange at one end thereof, said radial flange having a first internal coaxial annular surface in the form of a segment of a hemisphere to provide a first receptacle cavity in the end of the first flowline member;

a second flowline member having a central longitudinal axis, an axial flow passage, and an outwardly flaring end portion having a second internal coaxial annular surface to provide a second receptacle cavity configured as a segment of a hemisphere with the same radius of curvature as said first internal coaxial annular surface, said flaring end portion having an external surface formed as the segment of a sphere with a larger radius than the second internal coaxial annular surface and in coaxial relation therewith;

a collar disposed in sleeved relation on the flaring end portion of said second flowline member and provided with an interior annular surface having a first annular portion matching the curvature of the external surface of said flaring end portion and in conforming engagement therewith and a second annular portion with an internal diameter which is greater than the external diameter of said second flowline member;

a ball member in the form of a segment of a sphere symmetrical about a diameter of the sphere with a radius of curvature conforming to that of said first and second internal coaxial annular surfaces and disposed between said first and second flowline members with its external surface in conforming engagement with said first and second internal coaxial annular surfaces, said ball member having a flow passage extending therethrough in coaxial relation with said first flowline member and said collar;

a first annular seal means for establishing a fluid tight seal between said ball member and the first flowline member, and a second annular seal means for establishing a fluid tight seal between said ball member and the second flowline member;

means for joining said first flowline member to said second flowline member in a fixed relation to one another, said means comprising a plurality of bolts, each of which has a bolt shaft which extends through said radial flange into threaded engagement with said collar and clamps the collar against the second flowline member to hold the second flowline member in fixed relation to the first flowline member and the collar in spaced relation to the first flowline member, said bolts being arranged in an angular spacing around the longitudinal axes of the first flowline member and said collar; and a drive means for applying a force to stretch the length of each of said bolts by a limited amount to thereby loosen the engagement of the collar with the second flowline member and the junction of said first and second flowline members and to allow articulated movement of the second flowline member with respect to the first flowline member, said force being predetermined so as not to exceed the yield strength of said bolts and upon being withdrawn to allow the bolts to shrink in length and reestablish a clamping engagement of the collar with the second flowline member, said drive means includes a piston mounted on said first flowline member and responsive to an application of fluid pressure to drive said collar with a predetermined force in an axial direction away from said first flowline member to allow articulated movement of the second flowline member with respect to the first flowline member while retaining the seal of the ball member with the first and second flowline member and the sealing integrity of the connection, wherein said piston is in the form of a hollow cylinder in sleeved relationship to said external radial flange on the end of the first flowline member and which is provided with a transverse piston shoulder which is disposed in a first position of said piston to seat on a transverse shoulder provided on said external radial flange, said piston being moveable from said first position in response to an application of fluid pressure to where the end of said piston applies a driving force to urge said collar in an axial direction away from said first flowline member.

14. An articulated connector for connecting together portions of a pipeline as set forth in claim 13 wherein said radial flange is provided with a second flow passage having an inlet port adapted to be connected to a source of fluid pressure and an outlet port exposed to said piston transverse shoulder whereby the piston is adapted to be exposed to a source of hydraulic fluid pressure to apply force to drive said piston against said collar to thereby stretch and increase the length of each of said bolts by a limited distance and thereby loosen the junction between said flowline member and allow articulated pivotal movement of the second flow line member with respect to said first flow line member, said force being predetermined so as not to exceed the tensile strength of said bolts whereby upon withdrawal of the applied piston force the bolts will return to their original length.

* * * * *